No. 705,576. Patented July 29, 1902.
W. H. FORKER.
OVAL CUTTING MACHINE.
(Application filed Oct. 16, 1901.)
(No Model.) 2 Sheets—Sheet I.
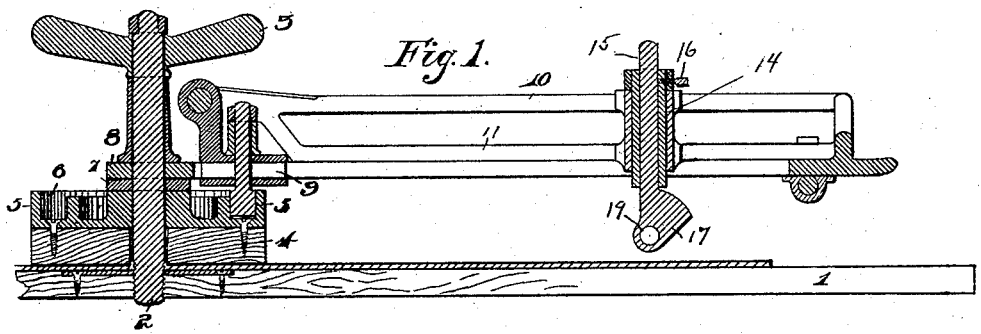
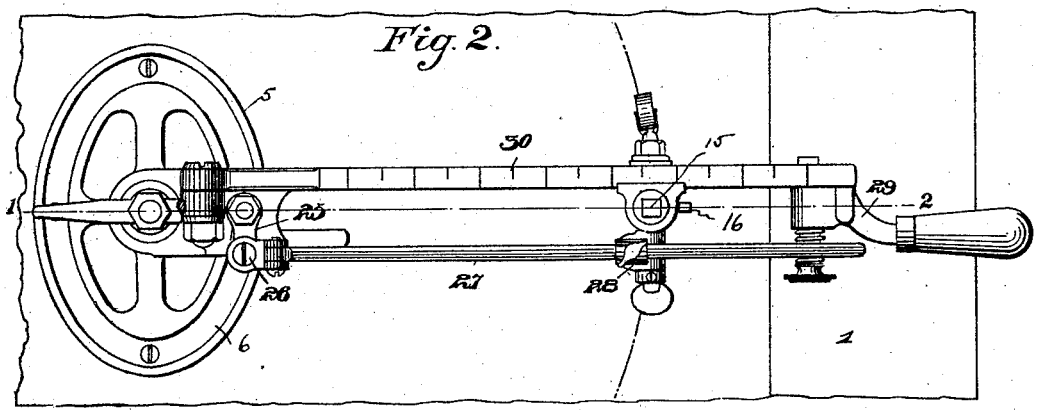
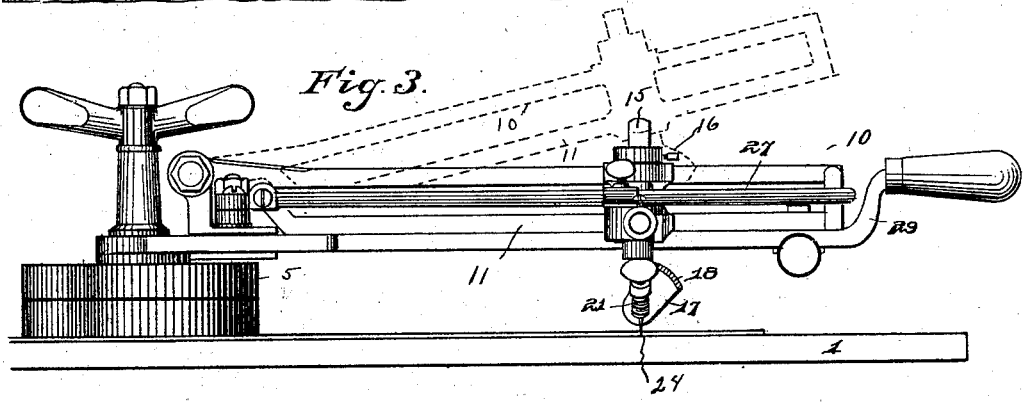
Witnesses
R. R. Lowry
M. Hunter
Inventor.
W. H. Forker
By C. D. Levis
Attorney.
THE NORRIS PETERS CO., PHOTO-LITHO., WASHINGTON, D. C.

No. 705,576. Patented July 29, 1902.
W. H. FORKER.
OVAL CUTTING MACHINE.
(Application filed Oct. 16, 1901.)
(No Model.) 2 Sheets—Sheet 2.
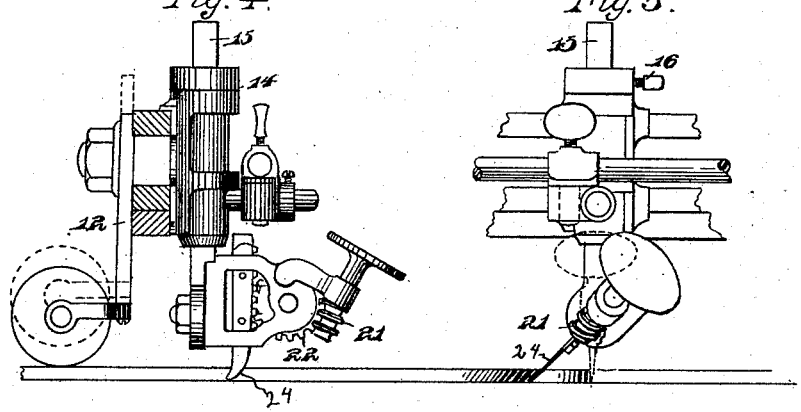
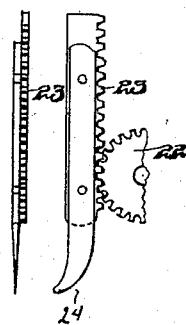
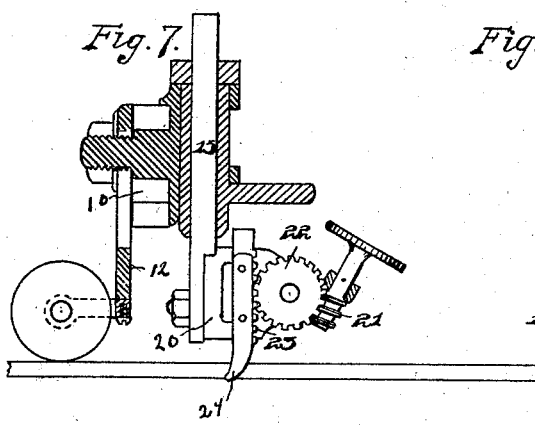
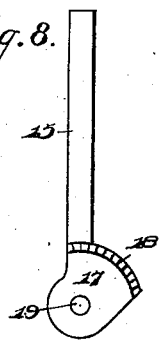
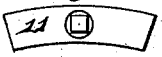
Witnesses
R. R. Lowry
M. Hunter
Inventor
W. H. Forker
By C. W. Lewis
Attorney.

UNITED STATES PATENT OFFICE.

WILLIAM H. FORKER, OF MEADVILLE, PENNSYLVANIA.

OVAL-CUTTING MACHINE.

SPECIFICATION forming part of Letters Patent No. 705,576, dated July 29, 1902.

Application filed October 16, 1901. Serial No. 78,777. (No model.)

*To all whom it may concern:*

Be it known that I, WILLIAM H. FORKER, a citizen of the United States, residing at Meadville, in the county of Crawford and State of Pennsylvania, have invented a new and useful Improvement in Oval-Cutting Machines, of which improvement the following is a specification.

This invention relates to certain new and useful improvements in oval-cutting machines, and relates more particularly to that class of machines employed for cutting mats for picture-frames and the like.

The present invention has for its object to cut all forms of circular shapes—such as circles, elliptical forms, and ovals—but for the purpose of illustrating my invention I have presented a machine for cutting ovals.

Another object of my invention is to provide novel means that will permit an adjustment of the cutter for the purpose of cutting any desired size of circle or oval; furthermore, to accurately gage the same and to provide means whereby the depth of the cut may be regulated.

A still further object of the invention is to mount the holder and cutter in a manner that will retain the cutter as the machine is operated in a manner that will produce a clean cut. Said holder and cutter although describing an arc of a circle will have an independent movement from the operating-arm.

The invention also aims to construct a machine of the above-described class that will be extremely simple in its construction, strong, durable, and comparatively inexpensive to manufacture; furthermore, one that will be highly efficient in its operation.

With the above and other objects in view the invention finally consists in the novel construction, combination, and arrangement of parts, to be hereinafter more particularly described, and specifically pointed out in the claims.

In describing the invention in detail reference is had to the accompanying drawings, forming a part of this specification, and wherein like numerals of reference indicate like parts throughout the several views, in which—

Figure 1 is a vertical sectional view taken on the line 1 2 of Fig. 2, illustrating my improved machine. Fig. 2 is a top plan view thereof. Fig. 3 is a side view of the same. Fig. 4 is a side elevation of the adjustable carriage-holder and cutter. Fig. 5 is a front elevation thereof. Fig. 6 is a side and front elevation of the cutter and cog-rack. Fig. 7 is a vertical sectional view of Fig. 4. Fig. 8 is a side elevation of the vertically-adjustable hanger carrying the holder. Fig. 9 is an end elevation of the segmental guide operating in the elliptical guideways. Fig. 10 is a top plan view thereof; Fig. 11, a side elevation of the same.

In the drawings the reference-numeral 1 represents the base-plate of the machine, upon which the mechanism is mounted; and 2 represents the screw-threaded shaft carrying handles 3.

The reference-numeral 4 represents the base upon which the elliptical guides 5 are mounted, forming a guideway 6, and 7 represents a central boss through which the screw-threaded shaft extends.

The reference-numeral 8 represents a washer upon said boss, and 9 the guide, upon which is slidingly mounted the arms 10, and 11 is the segmental guide, which is suitably mounted in said arms.

12 represents the carriage, secured to the head 14, said parts being securely attached to the arms 10. In the head 14 is adjustably secured a hanger 15, which is retained in position by means of a set-screw 16. The lower portion of the hanger carries an enlarged portion 17, in which is formed a segmental toothed rack 18 and an opening 19. To the enlarged portion 17 is secured the holder 20, carrying a worm-screw 21, operating a cog-wheel 22, the latter meshing with a cog-rack 23 of the cutter or knife 24, which is slidingly secured in said holder.

The reference-numeral 25 represents an arm secured to the shaft of the guide 5. This arm is pivotally secured at 26 to a rod 27, connected at 28 to the holder, and serves to impart an independent movement to the holder and knife.

29 represents the operating-handle, attached near the end of the arms, and 30 represents a scale or graduations on the arms.

It will be noted that independent adjustments are provided for the cutter, head, and carriage.

From the foregoing description and by referring to the accompanying drawings the manner of operating my machine will be readily apparent. It will be noted, however, that various changes may be made in the details of construction without departing from the general spirit of my invention.

In operation the knife is set at a position to cut the desired curve, and as the handle is swung back and forth or bent in a complete revolution on the pivotal pin 2 the knife will cut a curved line determined by the adjustment of the knife, which is on the outline of an ellipse, the bevel being regulated by the inclination at which the knife is held, the elliptical course that the knife takes being determined by the pin traveling in the groove 6.

Having fully described my invention, what I claim as new, and desire to secure by Letters Patent, is—

An oval-cutting machine, comprising in combination with the base, the pivotal pin 2, the plate 5 having an elliptical groove, a handle 29 pivotally mounted on said pin, a movable guide mounted on said handle, a pivoted bar carried by said guide, a pin passing through the latter and traveling in the elliptical groove in plate 5, a bar 15 adjustably held on said pivoted bar, a knife-holder clamped to the lower end of bar 15, a knife and rack-bar secured to the face thereof, a pinion in engagement with the teeth of said rack-bar, a worm-wheel mounted in said holder, and in engagement with the teeth of said pinion-wheel, the rod 27, the link 25 connected to one end of said rod, with its other end mounted on the top of the pin, working in said elliptical groove, a collar carried by said pivoted bar, and through which the rod 28 passes, as set forth.

In testimony whereof I have hereunto signed my name in the presence of two subscribing witnesses.

WILLIAM H. FORKER.

In presence of—
JAMES G. FOSTER,
WINFIELD S. ROSE.